United States Patent [19]

Williams et al.

[11] Patent Number: 5,697,609
[45] Date of Patent: Dec. 16, 1997

[54] LATERAL SHEET PRE-REGISTRATION DEVICE

[75] Inventors: Lloyd A. Williams, Mahopac; Joannes N. M. deJong, Suffern, both of N.Y.

[73] Assignee: Xerox Corporation, Stamford

[21] Appl. No.: 673,237

[22] Filed: Jun. 26, 1996

[51] Int. Cl.⁶ .................................................. B65H 7/02
[52] U.S. Cl. ........................................ 271/228; 271/251
[58] Field of Search ............................. 271/227, 228, 271/250, 251

[56] References Cited

U.S. PATENT DOCUMENTS

| | | | |
|---|---|---|---|
| 4,685,664 | 8/1987 | Petersdorf | 271/227 |
| 4,836,119 | 6/1989 | Siraco et al. | 271/251 |
| 5,219,159 | 6/1993 | Malachowski et al. | 271/228 |

FOREIGN PATENT DOCUMENTS

| | | | |
|---|---|---|---|
| 0026641 | 2/1991 | Japan | 271/228 |
| 405330702 | 12/1993 | Japan | 271/251 |
| 406234441 | 8/1994 | Japan | 271/227 |

*Primary Examiner*—H. Grant Skaggs
*Attorney, Agent, or Firm*—Kevin R. Kepner

[57] ABSTRACT

A registering device for an electrophotographic printing machine. A steerable pair of drive nips is located in the paper path. A lead edge sensor detects when a sheet is within the steerable drive nips. The steerable nips are turned so that the sheet is transported toward a side registration sensor located in the paper path. When the side registration sensor detects the edge of the sheet the actuator causes the steerable nips to be straightened. The sheet may be forwarded to a second, higher accuracy registration device for final registration. The steerable nip device provides a course preregistration device which may utilize inexpensive and non complex components. This device also enables the use of less expensive components in the fine registration device as the range of correction required by the fine registration device can be much narrower due to the preregistration device.

4 Claims, 4 Drawing Sheets

LATERAL SHEET PRE-REGISTRATION DEVICE

This invention relates generally to a sheet registration system, and more particularly concerns an accurate, highly agile apparatus and method for registering sheets in a high speed printing machine.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

High quality documents require registration of sheets of paper or other substrate to the photoreceptor for image transfer. Accurate registration control locates the image consistently with respect to the edge of the paper. This invention describes a device for registering a sheet in a paper path using relatively inexpensive components.

The following disclosures may relate to various aspects of the present invention:

U.S. Pat. No. 4,438,917 Patentee: Janssen et al. Issue Date: Mar. 27, 1984

U.S. Pat. No. 4,511,242 Patentee: Ashbee et al. Issue Date: Apr. 16, 1985

U.S. Pat. No. 4,519,700 Patentee: Barker et al. Issue Date: May 28, 1985

U.S. Pat. No. 4,971,304 Patentee: Lofthus Issue Date: Nov. 20, 1990

U.S. Pat. No. 5,078,384 Patentee: Moore Issue Date: Jan. 7, 1992

U.S. Pat. No. 5,094,442 Patentee: Kamprath et al. Issue Date: Mar. 10, 1992

U.S. Pat. No. 5,156,391 Patentee: Roller Issue Date: Oct. 20, 1992

U.S. Pat. No. 5,169,140 Patentee: Wenthe, Jr. Issue Date: Dec. 8, 1992

U.S. Pat. No. 5,273,274 Patentee: Thomson et al. Issue Date: Dec. 28, 1993

U.S. Pat. No. 5,278,624 Patentee: Kamprath et al. Issue Date: Jan. 11, 1994

Some portions of the foregoing disclosures may be briefly summarized as follows:

U.S. Pat. No. 4,438,917 describes a device for feeding sheets from a supply station aligning the sheets in an X, Y and theta coordinates and then gating the sheet into a work station. The device includes a pair of independently servo controlled motors disposed on opposite sides of the sheet. Each motor drives a nip roller which transports the copy sheet. Sensors are disposed to generate signals representative of sheet position in the X, Y and theta coordinates, which signals are used by the controller to adjust the angular velocity of the motor so that the sheet is squared and is gated onto the work station.

U.S. Pat. No. 4,511,242 describes a device utilizing electronic alignment of paper feeding components in a machine such as an electrophotographic copier. Alignment is obtained by placing an original master containing vernier calibrations on the document class and a target master containing vernier calibrations in the copy paper bin. The machine is operated to produce a copy of the original master onto the target master producing a double set of vernier calibrations on the target master, which, when compared, provide information relating to skew angle, side edge relationship and leading edge alignment of the image to the copy paper. The vernier calibrations provide data which are read into a microprocessor controlled copy feeding servo mechanism to correct copy paper position and remove misalignment. This operation is repeated for various combinations of paper feed paths so that the copy paper matches image position for all modes of copier operation. Additionally, sensors are located in the paper path to automatically correct for deviations in the copy sheet feeding unit, caused by wear, for example, over a period of time.

U.S. Pat. No. 4,519,700 describes a xerographic image transfer device in which copy sheets are sequentially aligned and position sensed before introduction to the image transfer zone. The position sensing is used to compare the copy sheet location with the position of the image panel on a moving photoconductor. The timing and velocity profile of the copy sheet drive after the position sensing is arranged so that the copy sheet arrives in registry with the image panel and at the same velocity.

U.S. Pat. No. 4,971,304 describes a method and apparatus for an improved active sheet registration system which provides deskewing and registration of sheets along a paper path in X, Y and theta directions. Sheet drivers are independently controllable to selectively provide differential and non differential driving of the sheet in accordance with the position of the sheet as sensed by an array of at least three sensors. The sheet is driven non differentially until the initial random skew of the sheet is measured. The sheet is then driven differentially to correct the measured skew, and to induce a known skew. The sheet is then driven non differentially until a side edge is detected, whereupon the sheet is driven differentially to compensate for the known skew. Upon final deskewing, the sheet is driven non differentially outwardly from the deskewing and registration arrangement.

U.S. Pat. No. 5,078,384 describes a method and apparatus for deskewing and registering a copy sheet, including the use of two or more selectably controllable drive rolls operating in conjunction with sheet skew and lead edge sensors, for frictionally driving and deskewing sheets having variable lengths. Subsequently, the sheets will be advanced so as to reach a predefined registration position at a predetermined velocity and time, at which point the sheets will no longer be frictionally engaged by the drive rolls.

U.S. Pat. No. 5,094,442 describes a position registration device for sheets in a feed path achieved without using guides or gates. Laterally separated drive rolls are speed controlled to correct for skew mis-positioning. Lateral registration is achieved by translation of the drive rolls transversely to the direction of sheet movement. Longitudinal registration is controlled by varying the speeds of the drive rollers equally.

U.S. Pat. No. 5,156,391 describes an apparatus and method to deskew sheets in a short paper path in an electrophotographic printing machine by differentially driving two sets of rolls so as to create a paper buckle buffer zone in the sheet and then differentially driving a roll set to correct the skew while the sheet is still within the nips of multiple drive roll sets.

U.S. Pat. No. 5,169,140 describes a method of deskewing and side registering a sheet which includes the step of driving a sheet non differentially in a process direction with a sheet driver, the sheet having an unknown magnitude of side to side registration and an unknown initial angle of skew. The method further includes the steps of measuring the initial skew angle with a sensing mechanism and driving the sheet differentially with the sheet driver to compensate for the magnitude of side to side misregistration and thereby induce a registration angle of skew. The method includes the steps of measuring the registration angle of skew with a sensing mechanism and summing the initial angle of skew and the registration angle of skew so as to determine an absolute angle of skew. The method includes driving the sheet differentially with the sheet driver to compensate for the absolute angle of skew so that the sheet is deskewed and one edge of the sheet is side registered.

U.S. Pat. No. 5,273,274 describes a sheet feeding and lateral registration system including feed rollers for feeding sheets in a process direction and registration apparatus for registering each sheet in a direction laterally of the process direction. The registration apparatus includes a shifting system for laterally shifting a carriage on which the feed rollers are mounted. A single edge sensor is arranged to provide a signal on detecting the presence of a sheet, and a control controls the lateral shifting system in response to that signal. The control is operated such that if the sheet is not detected by the sensor on initial entry of the sheet into the feed rollers, then the shifting system is activated to move the feed rollers laterally towards the sensor until the sheet is detected by the sensor, whereupon the lateral movement is stopped. If the sheet is detected by the sensor on initial entry of the sheet into the system, then the shifting system is activated to move the feed rollers laterally away from the sensor until the sensor no longer detects the sheet, and then the shifting system is reverse activated to laterally move the feed rollers back towards the sensor until the sheet is again detected by the sensor.

U.S. Pat. No. 5,278,624 describes a registration system for copy sheets using a pair of drive rolls and a drive system for commonly driving both drive rolls. A differential drive mechanism is provided for changing the relative angular position of one of the rolls with respect to the other roll to deskew the copy sheet. A control system is supplied with inputs representative of the skew of the copy sheet and controls the differential drive mechanism to deskew the copy sheet.

In accordance with one aspect of the present invention there is provided an apparatus for laterally registering the sheet along a paper path, comprising a first sensor located along the paper path, a second sensor, located along an edge of the paper path and a steerable drive mechanism for transporting said sheet along the paper path while imparting a lateral motion to the sheet as it is transported along the paper path.

Pursuant to another aspect of the present invention, there is provided An electrophotographic printing machine having a device for laterally registering a sheet along a paper path comprising a first sensor located along the paper path, a second sensor, located along an edge of the paper path and a steerable drive mechanism for transporting said sheet along the paper path while imparting a lateral motion to the sheet as it is transported along the paper path.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
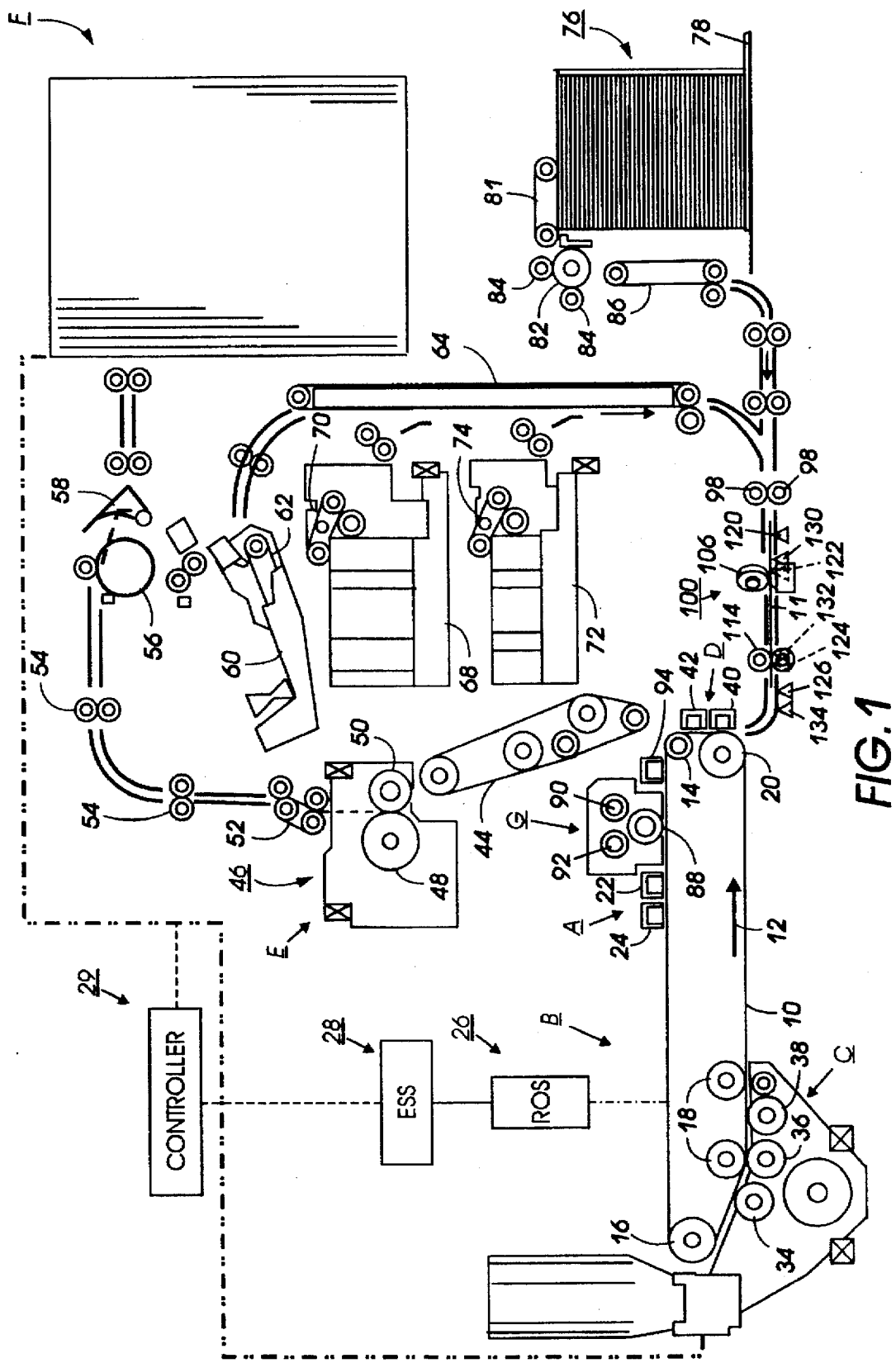
FIG. 1 is a schematic elevational view depicting an illustrative electrophotographic printing machine incorporating a sheet registration device of the present invention.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the set transfer device of the present invention may be employed in a wide variety of machines and is not specifically limited in its application to the particular embodiment depicted herein.

Referring to FIG. 1 of the drawings, the electrophotographic printing machine employs a photoconductive belt 10. Preferably, the photoconductive belt 10 is made from a photoconductive material coated on a ground layer, which, in turn, is coated on an anti-curl backing layer. The photoconductive material is made from a transport layer coated on a selenium generator layer. The transport layer transports positive charges from the generator layer. The generator layer is coated on an interface layer. The interface layer is coated on the ground layer made from a titanium coated Mylar®. The interface layer aids in the transfer of electrons to the ground layer. The ground layer is very thin and allows light to pass therethrough. Other suitable photoconductive materials, ground layers, and anti-curl backing layers may also be employed. Belt 10 moves in the direction of arrow 12 to advance successive portions sequentially through the various processing stations disposed about the path of movement thereof. Belt 10 is entrained about stripping roller 14, tensioning roller 16, idler roll 18 and drive roller 20. Stripping roller 14 and idler roller 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22. Next, the charged portion of the photoconductive surface is advanced through imaging station B.

At imaging station B, a raster output scanner (ROS), indicated generally by the reference numeral 26, discharges selectively those portions of the charge corresponding to the image portions of the document to be reproduced. In this way, an electrostatic latent image is recorded on the photoconductive surface. An electronic subsystem (ESS), indicated generally by the reference numerals 28, controls ROS 26. E S S 28 is adapted to receive signals from a computer and transpose these signals into suitable signals for controlling ROS 26 so as to record an electrostatic latent image corresponding to the document to be reproduced by the printing machine. ROS 26 may include a laser with a rotating polygon mirror block. The ROS 26 illuminates the charged portion of the photoconductive surface. In this way, a raster electrostatic latent image is recorded on the photoconductive surface which corresponds to the desired information to be printed on the sheet. Other types of imaging systems may also be used employing, for example, a pivoting or shiftable LED write bar or projection LCD (liquid crystal display) or other electro-optic display as the "write" source.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. A magnetic roll, positioned after developer roll 38, in the direction of arrow 12 is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl. Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. The sheets can be attached to one another by either a binder or a stapler. In either case, a plurality of sets of documents are formed in finishing station F. When duplex solenoid gate 58 diverts the sheet into duplex tray 60. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 face down on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from the secondary tray 68. The secondary tray 68 includes an elevator driven by a bi-directional AC motor. Its controller has the ability to drive the tray up or down. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 98 which feed the sheets to the registration device of the invention herein, described in detail below, and then to transfer station D.

Copy sheets may also be fed to transfer station D from the auxiliary tray 72. The auxiliary tray 72 includes an elevator driven by a directional AC motor. Its controller has the ability to drive the tray up or down. When the tray is in the down position, stacks of copy sheets are loaded thereon or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 98 to the registration device and then to transfer station D.

Secondary tray 68 and auxiliary tray 72 are secondary sources of copy sheets. The high capacity sheet feeder, indicated generally by the reference numeral 76, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 98 which, in turn, move the sheet through the registration device to transfer station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the rear of cleaning station G.

The various machine functions are regulated by a controller 29. The controller 29 is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets. In addition, the controller regulates the various positions of the gates depending upon the mode of operation selected.

The invention herein has been illustrated in a high speed black and white printing machine. It is also very suitable for use in a high speed full color or highlight color printing machine where accurate sheet registration is critical.

High quality documents require registration of sheets of paper to the photoreceptor for image transfer. Accurate registration control locates the image consistently with respect to the edge of the paper. This is a difficult task two accomplish in one step. A pre-registration device that makes a course adjustment reduces the requirement on the fine registration control in terms of sensor range for paper acquisition and torque requirements for registering. This invention describes a method for pre-registering the paper which allows the use of reduced range, higher accuracy, less expensive sensors in the fine registration control.

Figure 2:
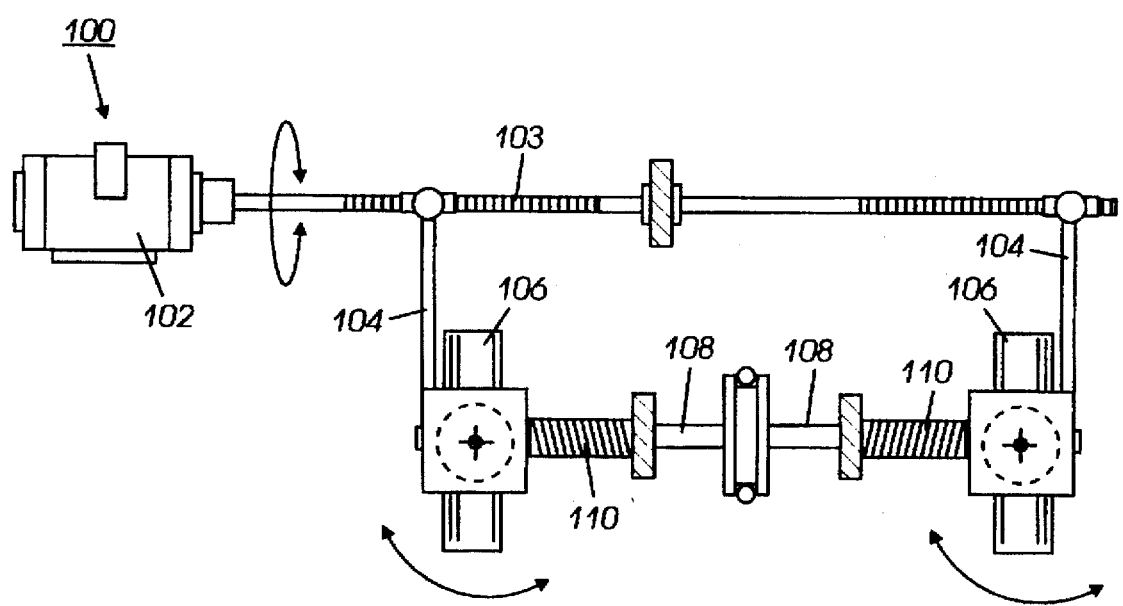
FIG. 2 is a detailed plan view of the sheet registration device.

FIG. 2 shows a device suitable for laterally pre-registering the paper. The device 100 operates similar to the front wheel steering mechanism of a car. The axle 108 is driven by a direct drive motor, timing belt drive system or any other suitable drive method (not shown). The accuracy of this drive is not very important and thus can be inexpensive. The two steering rolls 106 are connected with flexible couplings 110 to the drive axle 108. These couplings can be bellows, U joints, spiral spring couplings, etc. The rolls 106 are made to pivot by means of a yoke mechanism 104. Backup means of support for the paper can be balls, low friction rollers or steered rollers which follow the top rolls 106. The two yokes 104 are rigidly connected by arm 103 and an actuator 102 positions the angle of the wheels. Only two positions are necessary for steering control. Hence, the actuator 102 can be a solenoid or stepper/dc motor with lead screw with stops or home sensors.

Figure 3:
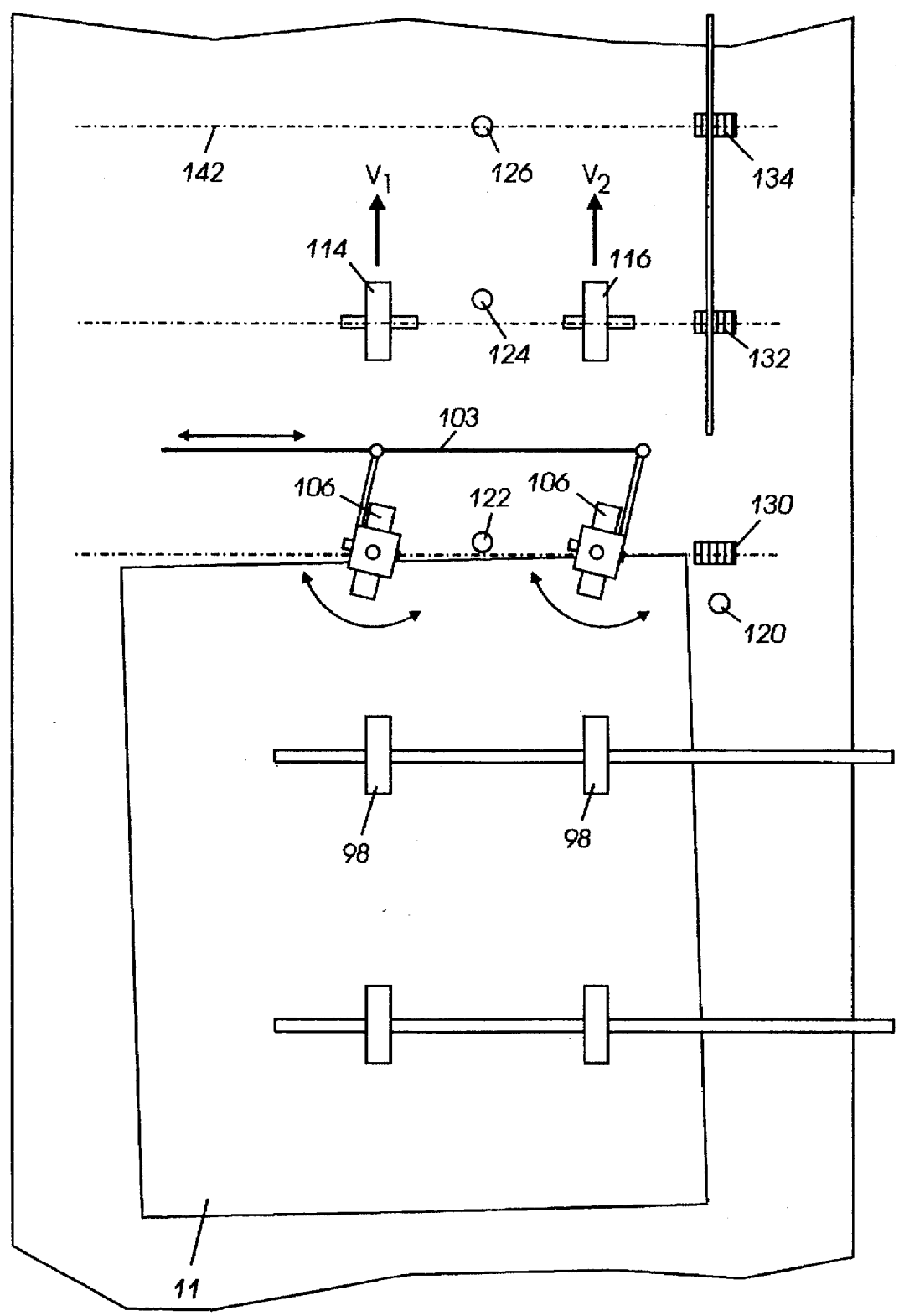
FIG. 3 is a plan view of the sheet registration device illustrating the method of operation thereof.

FIG. 3 describes the pre-registration strategy. Point sensor 122 detects the arrival of a sheet of paper. Before arrival, in the inter-image gap, the rolls 106 were pre-positioned to an angle alpha. The paper feed is offset so that point sensor 120 does not detect the presence of paper. The rolls will move the paper with a velocity V at an angle alpha. The lateral component Vx will move the paper towards the sensor 120. When sensor 120 detects paper, the yoke actuator 102 straightens the rolls (alpha=0). At this point the paper is pre-registered and handed off to the fine registration subsystem an example of which is described below. Note that the pre-registration does not require high accuracy. Inexpensive components, i.e. sensors, motors, actuators can be used.

Figure 4:
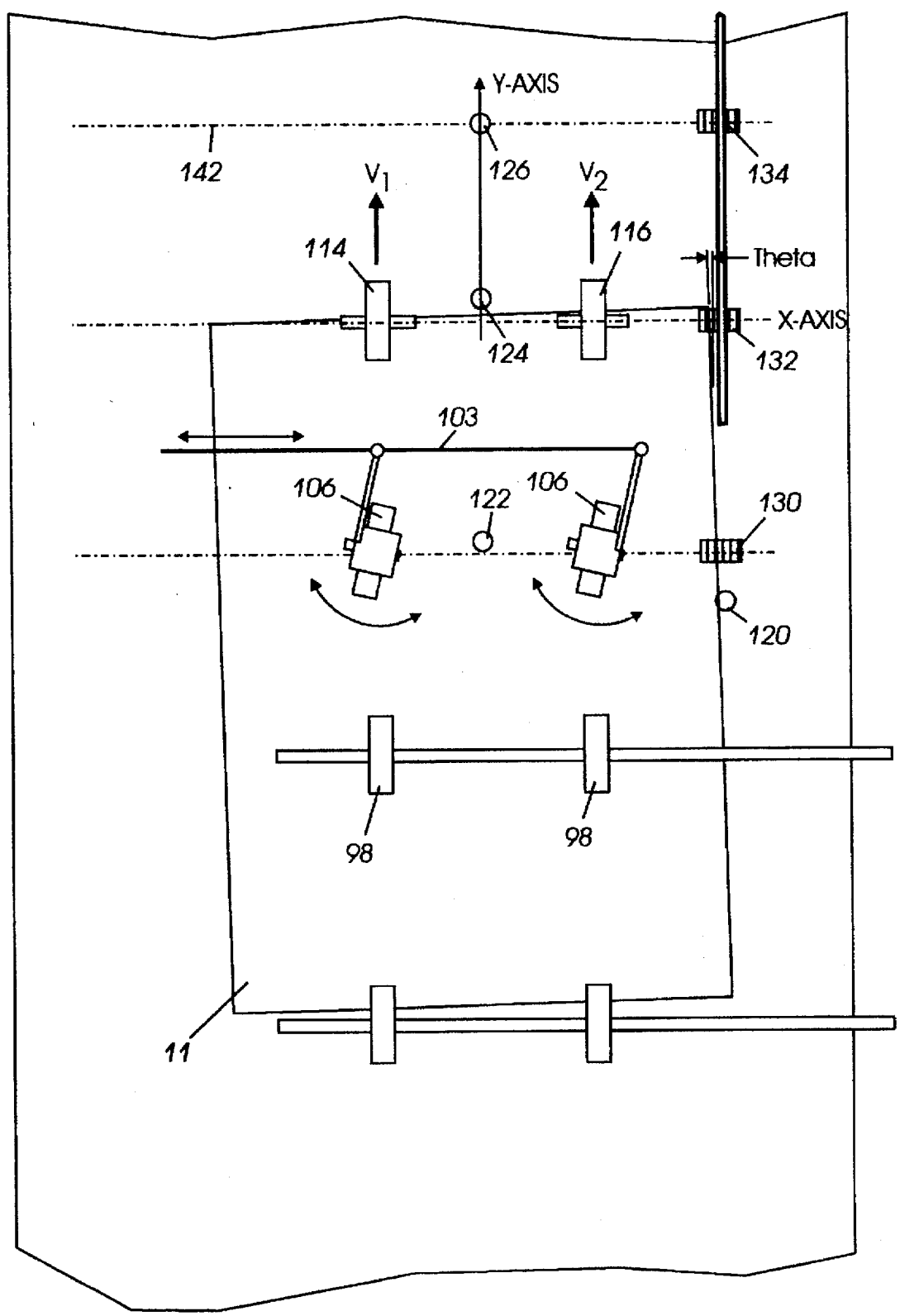
FIG. 4 is a plan view of an illustrative fine registration system used with the preregistration system described herein.

FIG. 4 illustrates a method for registration of a sheet of paper. Nip 114 and nip 116 impose velocities $V_1$ and $V_2$ to the paper, thus steering the paper. Appropriate velocity profiles can register the paper at datum 142 with proper position and orientation (zero skew). Methods for selecting the profiles as well as methods for servo control of the nips to impose these profiles are now described FIG. 4 shows a sheet of paper as it is entering the registration nip at datum 140 from preregistration device 100. Leading edge sensor 124 notifies the controller 29 that a sheet has entered the nip and time stamps the arrival for process direction registration. Paper lateral position and orientation (skew) are determined from measurements provided by edge sensors 132 and 134. With this information, the registration controller can generate the velocity profiles for registration at datum 142. The registration accuracy is evaluated at datum 142 with leading edge sensor 126 (process direction) and edge sensors 132 and 134.

The accuracy of the registration depends on the accuracies of sensors 126, 132 and 134 which measure the position of the paper upon entering of the nips 114, 116. Candidate sensors to measure the lateral edge position use a light source and a detector. The shadow of the edge is imaged onto the detector and the amount of light measured by a photodiode is a function of the lateral edge position. Other candidate sensors use a CCD array. Commercially available paper feeders feed paper with a lateral variation of up to 1.0 inch. Hence, the lateral position sensors must have a 1.0 inch range. The accuracy of the final registration is sometimes specified to be a few orders of magnitude more accurate. A sensor that does not effect this accuracy specification must have an accuracy and resolution of better than the required accuracy specification. Many of these sensors are needed in a registration subsystem. Sensors with reduced range are one order of magnitude less expensive. The details of the fine registration system are described in Attorney Docket No. D/96211Q, filed Jun. 26, 1996 as Ser. No. 08/672,489, entitled "SHEET REGISTRATION AND DESKEWING DEVICE" assigned to the assignee herein and filed on even date herewith, the pertinent portions of which are herein incorporated by reference.

In recapitulation, there is provided a registering device for an electrophotographic printing machine. A steerable pair of drive nips is located in the paper path. A lead edge sensor detects when a sheet is within the steerable drive nips. The steerable nips are turned so that the sheet is transported toward a side registration sensor located in the paper path. When the side registration sensor detects the edge of the sheet the actuator causes the steerable nips to be straightened. The sheet may be forwarded to a second, higher accuracy registration device for final registration. The steerable nip device provides a course preregistration device which may utilize inexpensive and non complex components. This device also enables the use of less expensive components in the fine registration device as the range of correction required by the fine registration device can be much narrower due to the preregistration device.

It is, therefore, apparent that there has been provided in accordance with the present invention, a sheet registration and deskewing device that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for registering a sheet along a paper path, comprising;

a first sensor located along the paper path;

a second sensor, located along an edge of the paper path;

a steerable drive mechanism for transporting said sheet along the paper path while imparting a lateral motion to the sheet as it is transported along the paper path a pair of independently driven nips located subsequent to said steerable drive mechanism along the paper path; and a third sensor located along the edge of the paper path in substantially the same lateral position as said second sensor, said pair of independently driven nips responsive to a signal from said third sensor for registering a sheet in the paper path.

2. An apparatus for registering a sheet along a paper path, comprising:

a first sensor located along the paper path;

a second sensor, located along an edge of the paper path;

a steerable drive mechanism for transporting said sheet along the paper path while imparting a lateral motion to the sheet as it is transported along the paper path, wherein said steerable drive mechanism comprises a drive nip, said drive nip being rotatable about an axis substantially perpendicular to a plane formed by the paper path and an actuator, responsive to a signal from said second sensor, for rotating said drive nip so that the sheet is moved, both in a direction along the paper path and a lateral direction to the path;

second drive nip parallel to said first mentioned nip and commonly connected thereto, so that said actuator causes said second drive nip to rotate coincidentally with said first mentioned nip;

a pair of independently driven, nips located subsequent to said steerable drive mechanism along the paper path; and a third sensor located along the edge of the paper path in substantially the same lateral position as said second sensor, said pair of independently driven nips responsive to a signal from said third sensor for registering a sheet in the paper path.

3. An electrophotographic printing machine having a device for laterally registering a sheet along a paper path comprising:

a first sensor located along the paper path;

a second sensor, located along an edge of the paper path;

a steerable drive mechanism for transporting said sheet along the paper path while imparting a lateral motion to the sheet as it is transported along the paper path;

a pair of independently driven nips located subsequent to said steerable drive mechanism along the paper path; and a third sensor located along the edge of the paper path in substantially the same lateral position as said second sensor, said pair of independently driven nips responsive to a signal from said third sensor for registering a sheet in the paper path.

4. An electrophotographic printing machine having a device for laterally registering a sheet along a paper path comprising:

a first sensor located along the paper path;

a second sensor, located along an edge of the paper path;

a steerable drive mechanism for transporting said sheet along the paper path while imparting a lateral motion to the sheet as it is transported along the paper path, wherein said steerable drive mechanism comprises a drive nip, said drive nip being rotatable about an axis substantially perpendicular to a plane formed by the paper path and an actuator, responsive to a signal from said second sensor, for rotating said drive nip so that the sheet is moved both in a direction along the paper path and a lateral direction to the path;

a second drive nip parallel to said first mentioned nip and commonly connected thereto, so that said actuator causes said second drive nip to rotate coincidentally with said first mentioned nip;

a pair of independently driven nips located subsequent to said steerable drive mechanism along the paper path; and a third sensor located along the edge of the paper path in substantially the same lateral position as said second sensor, said pair of independently driven nips responsive to a signal from said third sensor for registering a sheet in the paper path.

* * * * *